Dec. 29, 1953

R. H. SILVER 2,663,922

DUAL CHOKER HOOK

Filed Dec. 13, 1951

INVENTOR.
ROBERT H. SILVER
BY
Richard P. Cardew
AGENT

Patented Dec. 29, 1953

2,663,922

UNITED STATES PATENT OFFICE 2,663,922

DUAL CHOKER HOOK

Robert H. Silver, Schroeder, Minn.

Application December 13, 1951, Serial No. 261,480

2 Claims. (Cl. 24—129)

This invention relates to a hook for use on cables and the like, and has special reference to such a hook which is slidably carried on a cable, or similar flexible member, and has means to receive and hold one end of said cable when the latter is wrapped around an object to be moved by power means acting on the opposite end of the cable.

The instant invention has particular use in the logging industry and will be described in this respect; however, the same will be found useful in other industries as well.

In the logging industry, it is common practice to use a tractor, horse, or the like, to tow or pull logs from the place where they are cut to a road. In so doing, a "choker" cable is preferably used, one end of the choker being fastened around the log and the other end being fastened to the towing means. Sometimes a length of chain is used with a hook at one end and an eye at the other. However, chains are more expensive, break more easily, and are much heavier to handle and inconvenient to connect than "chokers" are. Chains do not function any better, if as well as "chokers."

A "choker" usually comprises a length of flexible steel cable having an eye formed at each end thereof and a so-called "round hook" carried in one of the eyes. The cable is wrapped once around the log and the "round hook" is engaged over the cable, forming a sliding loop around the log which tightens as soon as tension is applied to the cable to pull or tow the log, the eye at the opposite end of the cable serving as the tow connection. However, round hooks are not entirely satisfactory for this logging work as they catch in brush, roots, and other obstacles along the tow route, which often results in the cable being broken, the eyes of the cable being pulled open, or at least a sharp kink being put in the cable where the hook embraces the cable. In addition, logs often roll or twist when being dragged around corners and trees and especially when going down inclines. If the log should roll in the direction where the cable folds or bends further around the hook, the inconvenience which occurs may be the kinking of the cable. However, if the log rolls in the opposite direction, the grip of the hook on the cable may become disengaged or loosened sufficiently to release the log, necessitating a halt to re-hook the choker onto the log. All of this is annoying, inconvenient, and costly.

If a cable becomes kinked very badly, it does not slide well on the hook and poor connections or grips are so frequent that the cable is usually discarded long before its expected span of life is over. This, too, is costly.

It is, therefore, one of my principal objects to provide a hook for use with choker cables which will greatly reduce, if not eliminate entirely, the present inconveniences, annoyances, and extra expense involved in the use of chokers.

Another object is to provide a choker hook with positive cable-eye-receiving and holding means which is least subject to becoming loosened or unfastened during normal use.

Another object is to provide such a hook which will slide readily on a cable, even if the latter is kinked somewhat from unavoidable causes.

Another object is to provide a choker hook having similar cable-eye-receiving-means at each end thereof which may be used with their adjacent one of the two eyes of the choker cable just as conveniently, whereby the cable wear and abuse may be distributed to the two ends of the choker equally, thereby prolonging the life of the cable materially, as both ends of the choker are equally as convenient to the sliding hook.

Another object is to provide a choker hook whereby kinking of cables is materially reduced, if not eliminated.

Another object is to provide a choker hook which is least subject to becoming caught in roots, snags, brush, or the like, during normal use.

These and other objects and advantages of my invention will become more apparent as the description proceeds.

In the accompanying drawing forming a part of this application:

Figure 1:
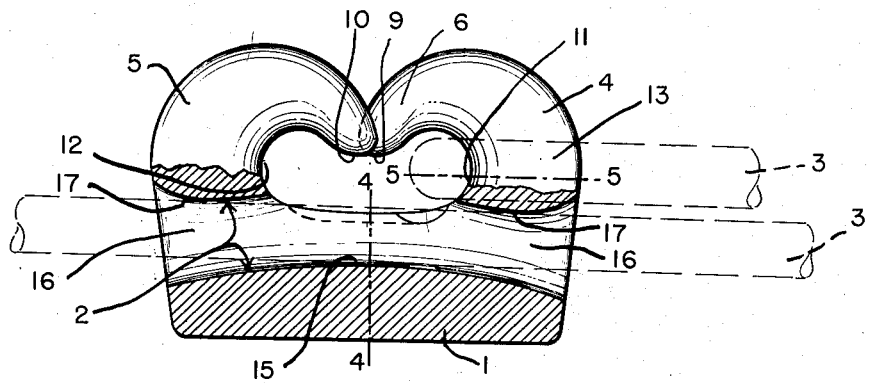
Figure 1 is a side elevational view, partly in section, of my invention showing how a cable is engaged over the cable hooks, and how a hook may slide freely on the cable because of the construction of the passage through the body of the hook.

In the drawing, the reference numeral 1 indicates the body portion of my choker hook which is preferably elongated, as shown, and has a passage 2 longitudinally therethrough through which the cable 3 extends, the passage 2 providing the means for slidably mounting the choker hook on the cable. On each end of the body portion 1 is a hook member, 4 and 5 respectively. Each of the hook members is similar in construction; however, they extend in opposite directions, or toward each other, whereby they are capable of working in opposition to each other.

The hook members 4 and 5 have adjacent opposed faces 6 and 7 which extend diagonally across the body portion in spaced relation to the body, of course, and in spaced, substantially parallel relation to each other, whereby an opening or slot 8 is provided between the hook members which extends diagonally or angularly across the body 1 and the passage 2 therethrough. This construction of the hooks results in the ends, 9 and 10 respectively, thereof being overlapped transversely of the body and somewhat thinner than the major portion of the hook members. The purpose of the slot 8 and overlapping ends 9 and 10 will become apparent.

Each of the hooks 4 and 5 has a throat, 11 and 12 respectively, closely adjacent the body 1 and the passage 2 which is rounded to provide a seat or bearing for an eye 13 of the cable 3, the throat preferably being slightly larger than the diameter of the cable on which the device is carried to permit and facilitate the installation and removal of the cable eye with respect thereto.

Intermediate the throats 11 and 12 of the hook members is an elongated opening 14 in the body 1 which communicates with the passage 2, as shown, the opening being of a width at least equal to the diameter of the cable which is used with the choker hook.

The passage 2 is specifically formed to facilitate the efficient employment of the choker hook and has a side wall 15 opposite the opening 14 which is arcuately shaped away from said opening, as shown, to provide a smooth curvature against which the cable may engage. The side walls 16—16 and the inner wall 17 of the passage are arcuately shaped to provide a flared opening at each end of the passage to reduce the possibility of kinks forming in the cable during its normal use.

Figures 2, 3:
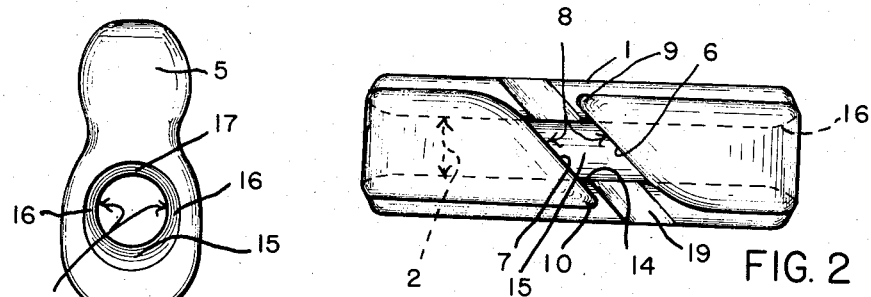
Figure 2 is a top plan view of my choker hook.
Figure 3 is an end elevational view of Figure 2.
Figures 4, 5:
Figure 4 is a fragmental sectional view on the line 4—4, Figure 1.
Figure 5 is a fragmental sectional view on the line 5—5, Fig. 1.
Figure 6:
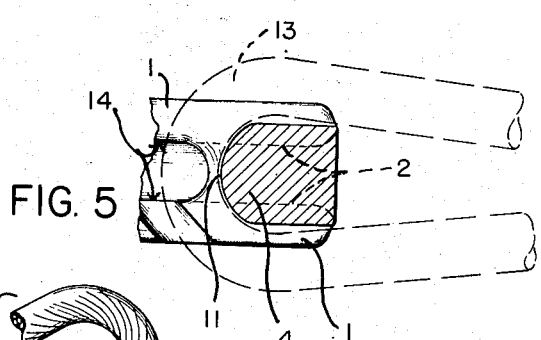
Figure 6 is a fragmental broken perspective view illustrating the use of the invention, and including the eye of one end only of the choker cable.

In addition, the particular construction of the passage 2 with the communicating lateral opening 14 provides for ease in sliding the choker hook along a cable which may have kinks and bends therein, as the choker hook can readily be twisted or rotated axially on the cable and the kinks may be worked through the passage with comparative ease. The passage as here shown and described provides no elongated narrow or constricted opening which would hinder a cable sliding thereon. As shown in Figure 3, however, there is a continuous substantially circular and unobstructed passage through the body 1 so that the device will slide smoothly on a straight cable (see Figure 1).

In operation, a length of cable 3 is rove through the passage 2 and then the eyes 13 may be formed thereon. The eyes prevent the loss of the hook from the cable. One of the eyes may be used for attaching one end of the cable to a power source, such as a tractor, truck, power crane, winch, or the like, and the opposite end of the cable may be wrapped around an object to be moved, such as a log. The other eye 13 may then be engaged on the one of the hooks 4 and 5 which faces the direction of pull by sliding one side of the eye loop through the slot 8 with the eye held in substantially a parallel plane with the slot and the opposed faces 6 and 7 of the hooks 4 and 5, or diagonally of the body 1. When the eye reaches or butts against the body 1, it may be rotated axially to encircle the one of the hooks 4 or 5 which it is desired to employ. Stress on the cable will swing the eye around to lie in parallel plane with the body where it cannot slip out of its engagement accidentally. The eye may be disengaged from the hook by swinging same around until it is disposed in alinement with the diagonal slot 8 where axial rotation of the eye and lifting movement will disengage same.

If desired, a groove 19 may be made in the body 1 in alinement with the slot 8 to facilitate the insertion and removal of the eye of a cable and to further insure against accidental disengagement of the eye from its hooked engagement.

It is to be understood that I have herein shown and described one specific embodiment of my invention, and that my appended claims are not necessarily limited specifically thereto but should be construed as broadly as permissible in view of the prior art.

Having thus described my invention, what I claim is:

1. A hook for use on a cable having an eye at one end thereof comprising: an elongated body member having a longitudinal passage therethrough, said passage serving to slidably receive said cable therethrough whereby said body member is slidably carried on said cable, a hook member extending laterally away from each end of said body portion toward the longitudinal center of said body and forming a cable eye receiving throat at each end of said body, said hooks having their free ends facing and overlapping each other transversely of said body portion, said hooks being spaced apart by a slot extending diagonally of said body to permit a cable eye to be engaged on and removed from said hooks, and said body member having an opening therein between said hooks and communicating with said passage to permit a kinked cable to slide readily therethrough.

2. A cable sling comprising a length of cable having an eye at each end thereof, and a choker hook slidably installed on said cable intermediate said eyes, said hook comprising: an elongated body member having a longitudinal passage therethrough, a hook member extending laterally away from each end of said body portion and toward the longitudinal center of said body and forming a cable eye receiving throat at each end of said body, said hooks having their free ends facing and overlapping each other transversely of said body portion, said hooks being spaced apart by a slot extending diagonally of said body to permit a cable eye to be engaged on and removed from said hooks, said longitudinal passage being adapted to receive a cable and to permit said body member to slide longitudinally of the cable forming a choker loop when one eye of said cable is carried on one of said hooks, the other of said hooks serving to hold said eye in place on its hook by virtue of the overlapping arrangement of said hooks, and said body member having an opening therein between said hooks and communicating with said passage to permit a kinked cable to slide readily therethrough.

ROBERT H. SILVER.

References Cited in the file of this patent
UNITED STATES PATENTS

| Number | Name | Date |
|---|---|---|
| 1,546,839 | Klingel | July 21, 1925 |
| 2,505,883 | Chevalier | May 2, 1950 |